(12) United States Patent
Matsuda (10) Patent No.: US 7,697,082 B2
(45) Date of Patent: Apr. 13, 2010

(54) ARRAY SUBSTRATE FOR LIQUID CRYSTAL PANEL AND LIQUID CRYSTAL PANEL AND MANUFACTURING METHOD THEREOF

(75) Inventor: Hiroshi Matsuda, Gifu (JP)

(73) Assignee: Epson Imaging Devices Corporation, Azumino-Shi, Nagano (JP)

( * ) Notice: Subject to any disclaimer, the term of this patent is extended or adjusted under 35 U.S.C. 154(b) by 264 days.

(21) Appl. No.: 11/729,449

(22) Filed: Mar. 29, 2007

(65) Prior Publication Data
US 2007/0229721 A1    Oct. 4, 2007

(30) Foreign Application Priority Data
Mar. 30, 2006    (JP)    ............... 2006-095760

(51) Int. Cl.
*G02F 1/1343*    (2006.01)
(52) U.S. Cl. ........................................ 349/39; 349/141
(58) Field of Classification Search ................. 349/141, 349/38, 39
See application file for complete search history.

(56) References Cited

U.S. PATENT DOCUMENTS

| | | | | |
|---|---|---|---|---|
| 6,115,097 A | * | 9/2000 | Yamazaki | .................... 349/151 |
| 6,246,453 B1 | * | 6/2001 | Zhang et al. | ................... 349/39 |
| 6,862,067 B2 | * | 3/2005 | Matsumoto et al. | .......... 349/141 |
| 6,950,168 B2 | * | 9/2005 | Yamazaki et al. | ............ 349/141 |
| 2006/0001817 A1 | * | 1/2006 | Yamazaki et al. | ............ 349/141 |
| 2006/0007380 A1 | * | 1/2006 | Yamazaki et al. | ............ 349/141 |
| 2007/0146591 A1 | * | 6/2007 | Kimura et al. | ............... 349/114 |
| 2007/0159570 A1 | * | 7/2007 | Nagasawa | ..................... 349/54 |
| 2007/0229748 A1 | * | 10/2007 | Fujita | ........................... 349/141 |

FOREIGN PATENT DOCUMENTS

JP    2002-296611    10/2002

* cited by examiner

*Primary Examiner*—David Nelms
*Assistant Examiner*—Thanh-Nhan P Nguyen
(74) *Attorney, Agent, or Firm*—McCarter & English, LLP (57) ABSTRACT

A method of manufacturing an array substrate for a liquid crystal panel includes forming a lower conductive film above a circuit layer. A lower display electrode is formed using the lower conductive film in a display region and a lower capacitor electrode of a capacitor is formed using the lower conductive film in a peripheral region which is external to the display region. The method of manufacturing includes forming an upper conductive film above the lower display electrode and the lower capacitor electrode. An upper display electrode is formed using the upper conductive film in the display region and an upper capacitor electrode of the capacitor is formed using the upper conductive film in the peripheral region.

3 Claims, 11 Drawing Sheets

ARRAY SUBSTRATE FOR LIQUID CRYSTAL PANEL AND LIQUID CRYSTAL PANEL AND MANUFACTURING METHOD THEREOF

BACKGROUND

1. Technical Field

The present invention relates to an array substrate for a liquid crystal panel, to a liquid crystal panel, and to manufacturing methods thereof, and, in particular, to realizing an increase in an area of a capacitor and inhibition of an enlargement of the peripheral region in a structure of an array substrate having two display electrodes forming an electric field for controlling an alignment of liquid crystal and a capacitor provided in the peripheral region (also called a "frame region").

2. Related Art

In liquid crystal panels using a low temperature polysilicon (LTPS), it is very common for a part of a driving device such as, for example, a shift register, a voltage boosting circuit, a buffer, and so on to be formed in a peripheral region of an array substrate. In addition, in a liquid crystal panel in which circuits such as a digital-to-analog converter (DAC) are built in the peripheral region, a capacitance element, that is, a capacitor, which is necessary for the circuit is formed by a layered structure of a gate line and a polysilicon line or a layered structure of a gate line and a source line. The capacitor is placed alongside the circuit elements.

In recent years, there has been active effort to develop FFS (Fringe Field Switching) mode liquid crystal panels having a wide angle of view, such as those disclosed in, for example, JP-A-2002-296611.

In low temperature polysilicon techniques, the formation of a thin insulating film suitable for a capacitor is not necessarily easy, and, in general, the capacitor insulating film is formed in a thick thickness. Thus, the capacitor electrode is widened to increase the capacitance.

However, increasing the area occupied by the capacitor creates a disadvantage in that the peripheral region in which the capacitor is placed must be enlarged.

SUMMARY

An advantage of some aspects of the invention is that a liquid crystal panel, an array substrate for a liquid crystal panel, and manufacturing methods thereof are provided in which the enlargement of the peripheral region can be inhibited, even when the area of the capacitor provided in the peripheral region is increased.

According to an aspect of the invention, there is provided a method of manufacturing an array substrate for a liquid crystal panel. The method of manufacturing includes forming a lower conductive film above a circuit layer. A lower display electrode is formed using the lower conductive film in a display region and a lower capacitor electrode of a capacitor is formed using the lower conductive film in a peripheral region which is external to the display region. The method of manufacturing includes forming an upper conductive film above the lower display electrode and the lower capacitor electrode. An upper display electrode is formed using the upper conductive film in the display region and an upper capacitor electrode of the capacitor is formed using the upper conductive film in the peripheral region.

According to another aspect of the invention, there is provided an array substrate for a liquid crystal panel including a lower display electrode, an upper display electrode, a circuit element, and a capacitor. The lower display electrode and the upper display electrode are layered in a display region with an interlayer insulating film therebetween. The lower display electrode and the upper display electrode are capable of forming an electric field which controls an alignment of liquid crystal. The circuit element and the capacitor are layered in a peripheral region which is external to the display region, and are connected to each other. The capacitor has a lower capacitor electrode, an upper capacitor electrode, and a capacitor insulating film. The lower capacitor electrode is formed of the same material as that of the lower display electrode and in the same thickness as that of the lower display electrode. The upper capacitor electrode is formed of the same material as that of the upper display electrode and in the same thickness as that of the upper display electrode. The capacitor insulating film is provided between the lower capacitor electrode and the upper capacitor electrode.

With the above-described structure, because the capacitor is formed using the lower display electrode and the upper display electrode layered with the interlayer insulating film therebetween, the capacitor and the circuit element to be connected to the capacitor can be layered. Therefore, even when the area of the capacitor is increased, the enlargement of the peripheral region of the liquid crystal panel can be inhibited compared to a structure in which the capacitor is placed alongside the circuit element using, for example, the layered structure of the gate line and the polysilicon line.

BRIEF DESCRIPTION OF THE DRAWINGS

The invention will be described with reference to the accompanying drawings, wherein identical reference numbers are used to identify corresponding elements.

DESCRIPTION OF EXEMPLARY EMBODIMENTS

Figure 1:
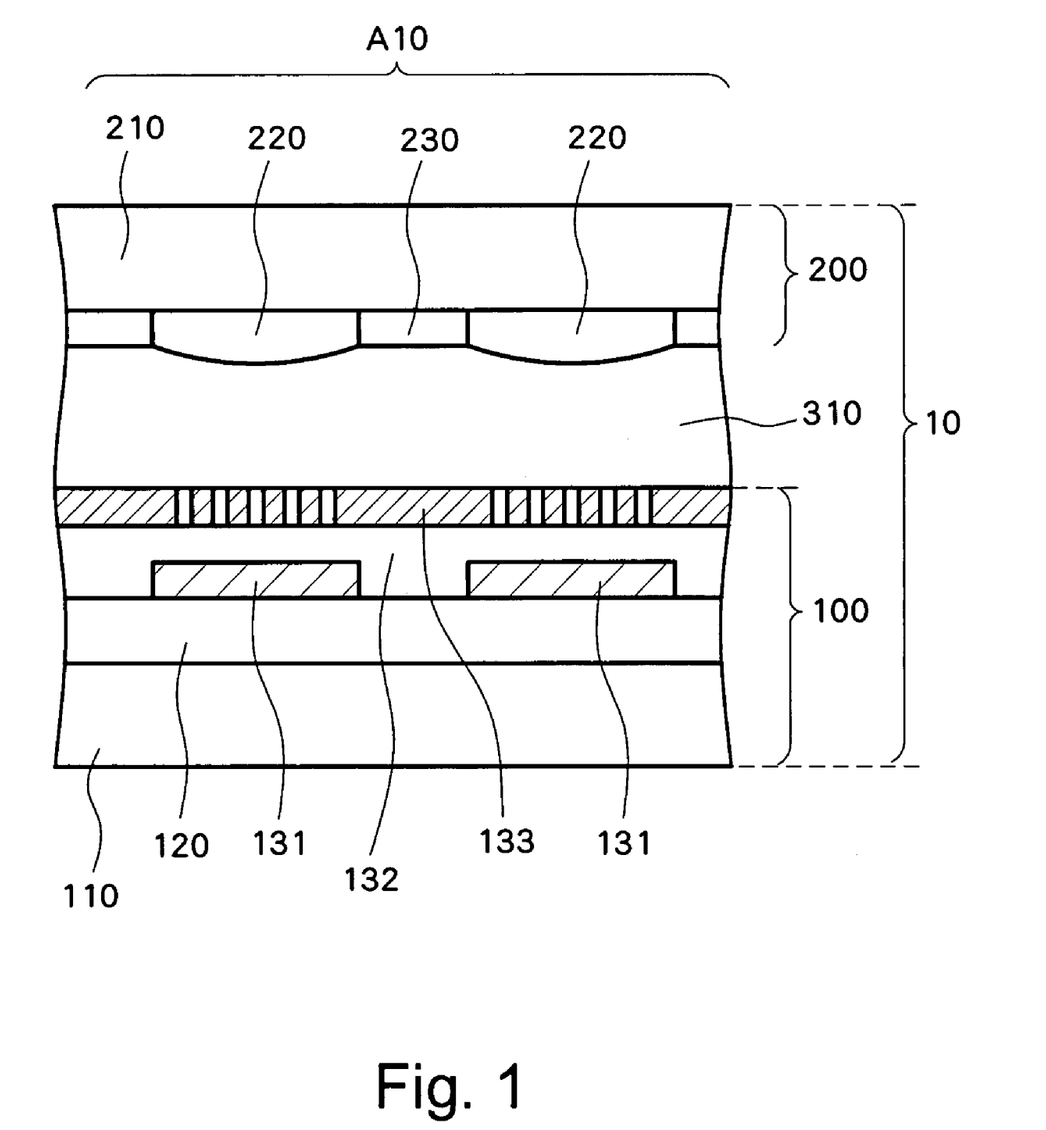
FIG. 1 is a cross sectional view showing a liquid crystal panel according to a preferred embodiment according of the invention.

FIG. 1 is a cross sectional view showing a liquid crystal panel 10 according to a preferred embodiment of the invention. FIG. 1 illustrates a structure in a display region A10 of the liquid crystal panel 10, which is a region in which, for example, pixels are arranged in a matrix form and a video image or the like is displayed.

As shown in FIG. 1, the liquid crystal panel 10 includes an array substrate 100, an opposing substrate 200 which is placed opposing the array substrate 100, and liquid crystal 310 held between the two substrates 100 and 200. The array substrate 100 is also referred to as a TFT substrate or an element substrate and the opposing substrate is also referred to as a color filter substrate.

Figure 2A:
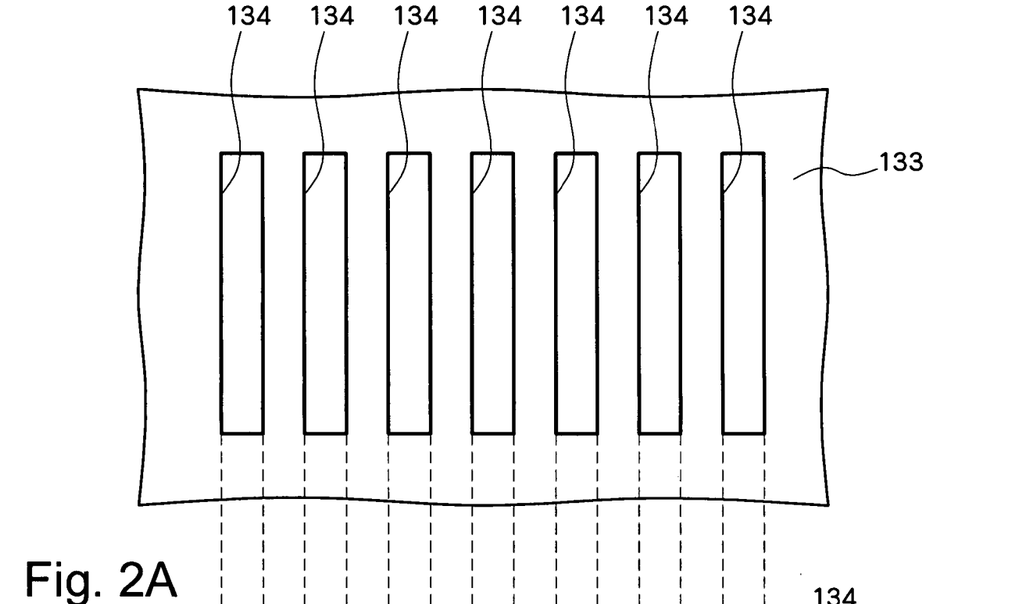
FIG. 2A is a plan view showing an array substrate according to a preferred embodiment of the invention.
Figure 2B:
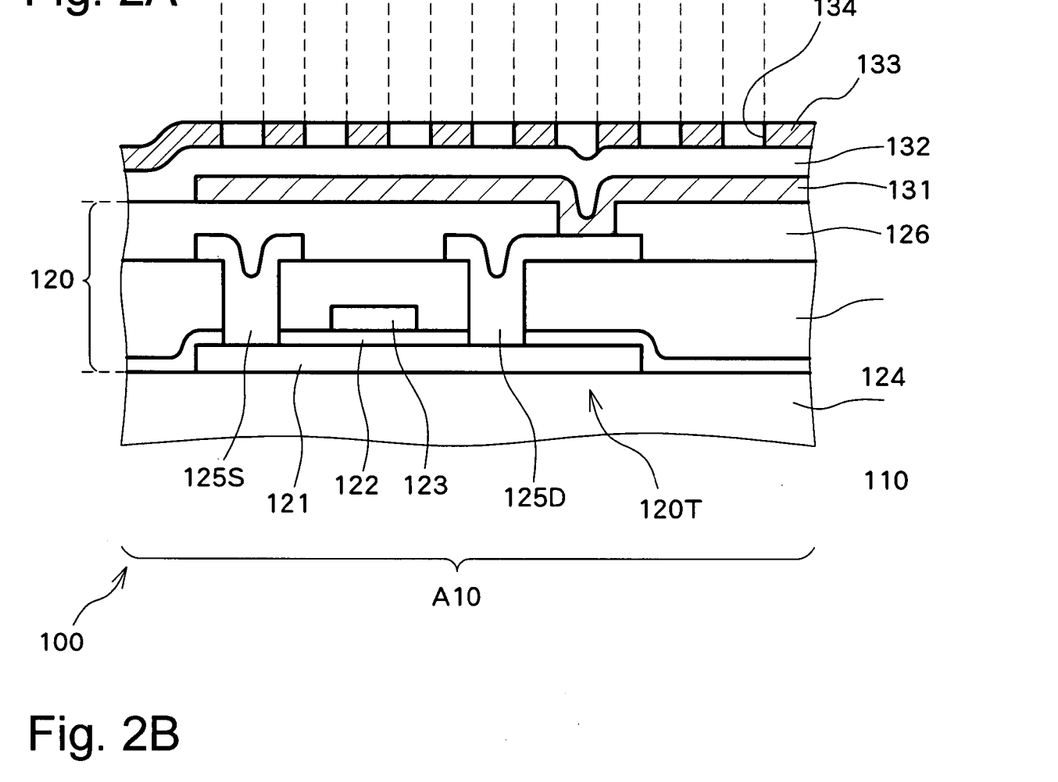
FIG. 2B is a cross sectional view showing an array substrate according to a preferred embodiment of the invention.

FIGS. 2A and 2B are, respectively, a plan view and a cross sectional view of the display region A10 of the array substrate 100. As shown in FIGS. 1, 2A, and 2B, the array substrate 100 includes a substrate 110 made of glass or the like, a circuit layer 120 in which a pixel TFT (Thin Film Transistor) 120T or the like is formed, a pixel electrode 131, an interlayer insulating film 132, a common electrode 133, and an alignment layer (not shown). The pixel TFT 120T and the pixel electrode 131 are provided for each pixel, and, thus, FIG. 1 shows a structure of two pixels and FIGS. 2A and 2B show a structure of a pixel.

As shown in FIG. 2B, the circuit layer 120 has a semiconductor film 121, a gate insulating film 122, a gate electrode 123, an interlayer insulating film 124, a source electrode 125S, a drain electrode 125D, and an interlayer insulating film 126. The gate electrode 123, the gate insulating film 122, and the semiconductor film 121 are formed as components of a MIS (Metal Insulator Semiconductor) or MOS (Metal Oxide Semiconductor) structure of the pixel TFT 120T.

The semiconductor film 121 is provided to each pixel, and is locally placed above a surface of the substrate 110 opposing the opposing substrate 200. The semiconductor film 121 is made of, for example, a silicon film, and a source region, a drain region, and a channel region between the source region and the drain region (none of which is shown) are provided in the semiconductor film 121 for the pixel TFT 120T.

The gate insulating film 122 is made of, for example, a silicon oxide film or a silicon nitride film, and is layered on the semiconductor film 121 and the substrate 110.

The gate electrode 123 is made of, for example, a semiconductor film such as silicon or a metal film, and is provided on the gate insulating film 122 at a position opposing the channel region of the semiconductor film 121 with the gate insulating film 122 therebetween.

The interlayer insulating film 124 is made of, for example, a silicon oxide film, and is layered on the gate electrode 123 and the gate insulating film 122. The interlayer insulating film 124 also functions as a planarizing film.

The source electrode 125S and the drain electrode 125D are made of, for example, a metal film, and are layered on the interlayer insulating film 124. A contact hole is formed through the interlayer insulating film 124 and the gate insulating film 122 reaching the source region of the semiconductor film 121. The source electrode 125S is electrically connected to the source region through the contact hole. Similarly, the drain electrode 125D is electrically connected to the drain region of the semiconductor film 121 through a contact hole formed through the interlayer insulating film 124 and the gate insulating film 122.

The interlayer insulating film 126 is made of, for example, a silicon oxide film, and is layered on the source electrode 125S, on the drain electrode 125D, and on the interlayer insulating film 124. The interlayer insulating film 126 also functions as a planarizing film.

The pixel electrode 131 is layered on the interlayer insulating film 126 of the circuit layer 120, and is provided for each pixel. The pixel electrode 131 is made of, for example, a light-transmitting conductive film such as ITO (Indium Tin Oxide) or IZO (Indium Zinc Oxide). By forming light reflecting conductive film such as a metal over all or a portion of the pixel electrode 131, it is possible to form the liquid crystal panel 10 as a reflective or transflective liquid crystal panel. A contact hole reaching the drain electrode 125D is formed through the interlayer insulating film 126, and the pixel electrode 131 is electrically connected to the drain electrode 125D through the contact hole. Therefore, a potential (driving potential) of the pixel electrode 131 during driving is controlled by a driving device (not shown) through the pixel TFT 120T. Although in this configuration, an electrode connected to the pixel electrode 131 is referred to as a drain electrode, it is also possible to refer to the electrode as a source electrode.

The interlayer insulating film 132 is made of, for example, a silicon oxide film, and is layered on the pixel electrode 131 and on the interlayer insulating film 126 of the circuit layer 120.

The common electrode 133 is made of, for example, a light-transmitting conductive film such as ITO or IZO. The common electrode 133 is layered on the interlayer insulating film 132, so that the common electrode 133 and the pixel electrode 131 are layered with the interlayer insulating film 132 therebetween in the display region A10. The common electrode 133 is provided over the entire region of the display region A10, and is provided common to the pixels in the display region A10, that is, the pixel electrodes 131 in the display region A10. At least one opening 134 penetrating through the common electrode 133 in the thickness direction is formed at a position of the common electrode 133 opposing the pixel electrode 131. The shape and number of the openings 134 are not limited to those shown in the drawings.

An alignment layer (not shown) is placed on the common electrode 133.

Figure 3:
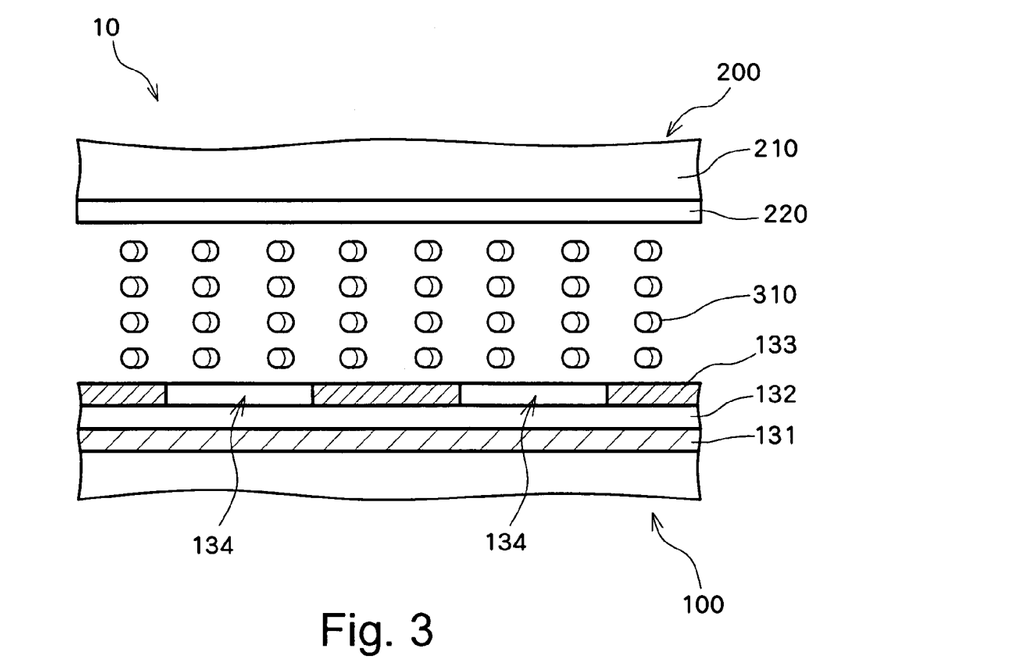
FIG. 3 is a schematic view illustrating control of an alignment of liquid crystal in a liquid crystal panel according to a preferred embodiment of the invention when no electric field is applied.
Figure 4:
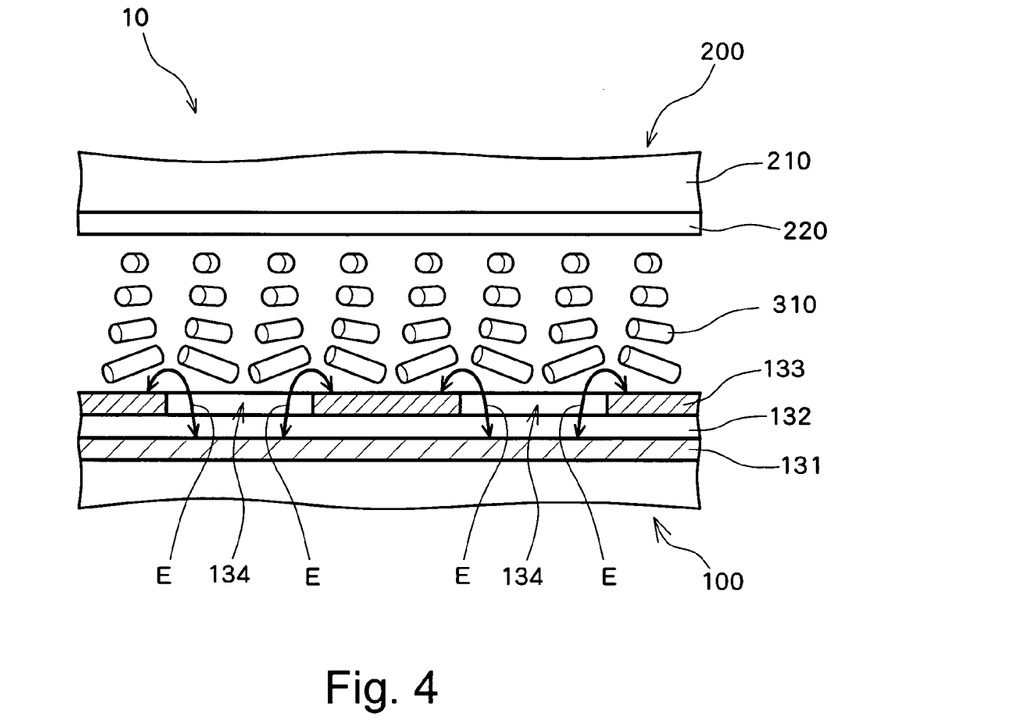
FIG. 4 is a schematic view illustrating control of an alignment of liquid crystal in a liquid crystal panel according to a preferred embodiment of the invention when an electric field is applied.

FIGS. 3 and 4 are schematic views illustrating control of an alignment of liquid crystal 310 in the liquid crystal panel 10. As shown in FIG. 3, when the pixel electrode 131 and the common electrode 133 are set at a same potential, the liquid crystal 310 is aligned in a predetermined state. When, on the other hand, the potential of the pixel electrode 131 is set to a value different from that of the common electrode 133, an electric field E is formed through the opening 134 between the electrodes 131 and 133 as shown in FIG. 4, and the liquid crystal 310 is aligned in a state different from the state when no electric field is applied, which is shown in FIG. 3. In this process, the alignment of the liquid crystal 310, that is, the transmittance of the liquid crystal 310, is controlled by the strength of the electric field E between the electrodes 131 and 133, and the display light is dimmed. It is, of course, possible to employ alignments different from those shown in FIGS. 3 and 4, as long as the alignment can be controlled by the electric field E between the pixel electrode 131 and the common electrode 133.

Because the pixel electrode 131 and the common electrode 133 control the display in the pixel, these electrodes can be referred to as display electrodes. In addition, in the liquid crystal panel 10 of FIGS. 1, 2A and 2B, the pixel electrode 131, the interlayer insulating film 132, and the common electrode 133 are layered in this order. When a side nearer to the substrate 110 is expressed to be a "lower", the pixel electrode 131 can also be referred to as a lower display electrode and the common electrode 133 can be referred to as an upper display electrode.

A technique for controlling the alignment of the liquid crystal by an electric field between two display electrodes in a panel such as the liquid crystal panel 10 having two display electrodes layered on an array substrate with the interlayer insulating film therebetween is referred to as an FFS (Fringe Field Switching) mode.

As shown in FIG. 1, the opposing substrate 200 includes a substrate 210 made of glass or the like, a color filter 220, a light-shielding film 230, and an alignment layer (not shown).

The color filter 220 is placed on a surface of the substrate 210 opposing the array substrate 100 at a position opposing the pixel electrode 131 of the array substrate 100. In other words, the color filter 220 is provided for each pixel. The color filter 220 is made of, for example, a resin film of a color corresponding to the display color of the pixel.

The light-shielding film 230 is made of a resin film or a metal film such as chromium (Cr), and is provided on the substrate 210 to fill the gap between adjacent color filters 220.

An alignment layer (not shown) is provided on the color filter 220 and the light-shielding film 230.

The array substrate 100 and the opposing substrate 200 are placed so that the alignment layers (not shown) of the substrates 100 and 200 oppose each other, and the liquid crystal 310 is held in a gap between the substrate 100 and 200.

Next, a structure of a peripheral region A20, which is a region external to the display region A10, of the liquid crystal panel 10, in particular, of the array substrate 100, will be described.

Figure 5:
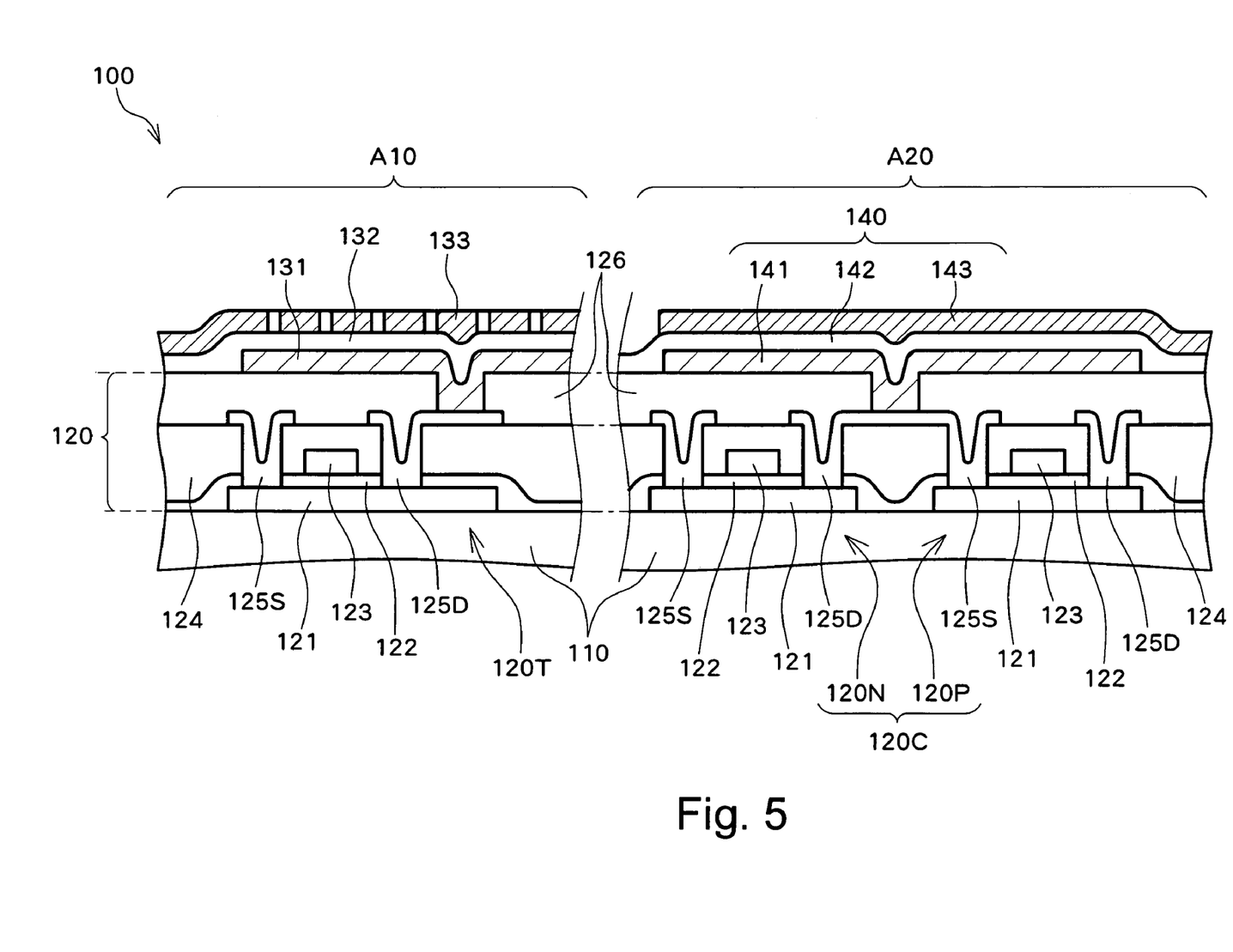
FIG. 5 is a cross sectional view showing an array substrate according to a preferred embodiment of the invention.

FIG. 5 is a cross sectional view of the array substrate 100. In FIG. 5, a structure in the peripheral region A20 is shown in addition to the structures in the display region A10. A part or all of the driving device (not shown) is provided in the peripheral region A20 of the array substrate 100, and FIG. 5 exemplifies an inverter with a load.

As shown in FIG. 5, in the array substrate 100, the circuit layer 120 also extends into the peripheral region A20. An N-channel TFT 120N and a P-channel TFT 120P are provided in the circuit layer 120 in the peripheral region A20, and an interlayer insulating film 126 of the circuit layer 120 is placed covering the TFTs 120N and 120P. Because the N-channel TFT 120N and the P-channel TFT 120P have basic structures similar to that of the pixel TFT 120T, corresponding structures are assigned the same reference numeral and will not be described again. A drain electrode 125D of the N-channel TFT 120N and a source electrode 125S of the P-channel TFT 120P are connected to each other on the interlayer insulating film 124, such that a CMOS (Complementary MOS) circuit 120C is formed.

The array substrate 100 also includes a capacitor 140 in the peripheral region A20. The capacitor 140 and a circuit element to which the capacitor 140 is to be connected, here, the TFTs 120N and the 120P, are layered above the substrate 110. The capacitor 140 has a structure in which a lower capacitor electrode 141 and an upper capacitor electrode 143 oppose each other with a capacitor insulating film 142 therebetween. The lower capacitor electrode 141, the capacitor insulating film 142, and the upper capacitor electrode 143 are layered in that order above the interlayer insulating film 126 covering the TFTs 120N and 120P. Of the two capacitor electrodes 141 and 143, the electrode nearer to the substrate 110 is referred to as a lower capacitor electrode in this description. The upper capacitor electrode 143 does not contact the lower electrode 141 due to the capacitor insulating film 142, and is provided above the lower capacitor electrode 141.

The lower capacitor electrode 141 is formed of the same material as the pixel electrode 131 and of the same thickness as the pixel electrode 131. The lower capacitor electrode 141 is provided on the interlayer insulating film 126 of the circuit layer 120. A contact hole reaching the drain electrode 125D of the N-channel TFT 120N or the source electrode 125S of the P-channel TFT 120P is formed through the interlayer insulating film 126, and the lower capacitor electrode 141 is electrically connected to the drain electrode 125D of the N-channel TFT 120N and the source electrode 125S of the P-channel TFT 120P through the contact hole.

The capacitor insulating film 142 is formed of the same material as the interlayer insulating film 132 which is provided between the pixel electrode 131 and the common electrode 133, and with the same thickness as the interlayer insulating film 132. The capacitor insulating film 142 is placed on the lower capacitor electrode 141. A distinct capacitor insulating film 142 may be provided for each capacitor 140, or a common capacitor insulating film 142 may be formed for a plurality of adjacent capacitors 140 by providing the capacitor insulating film 142 over the plurality of capacitors 140. Because the capacitor insulating film 142 is formed of the same material as that of the interlayer insulating film 132, it is also possible to provide an insulating film over the display region A10 and the peripheral region A20, to form both the capacitor insulating film 142 and the interlayer insulating film 132 with the insulating film.

The upper capacitor electrode 143 and common electrode 133 are formed of the equal thickness and of the same material. The upper capacitor electrode 143 is located on the capacitor insulating film 142 and opposed to the lower capacitor electrode 141 with the capacitor insulating film 142 therebetween. An upper capacitor electrode 143 may be provided for each capacitor 140, or a common upper capacitor electrode 143 may be formed for a plurality of adjacent capacitors 140 by providing the upper capacitor electrode 143 over the plurality of capacitors 140. Because the upper capacitor electrode 143 is formed of the same material as that of the common electrode 133, when a same potential is applied to the electrodes 143 and 133, it is possible to provide a conductive film over the display region A10 and the peripheral region A20, and form the upper capacitor electrode 143 and the common electrode 133 with the conductive film.

Although in the description, the N-channel TFT 120N and the P-channel TFT 120P forming the CMOS circuit 120C were provided as examples of circuit elements to which the capacitor 140 may be connected, the invention is not limited to such a configuration.

Figure 6:
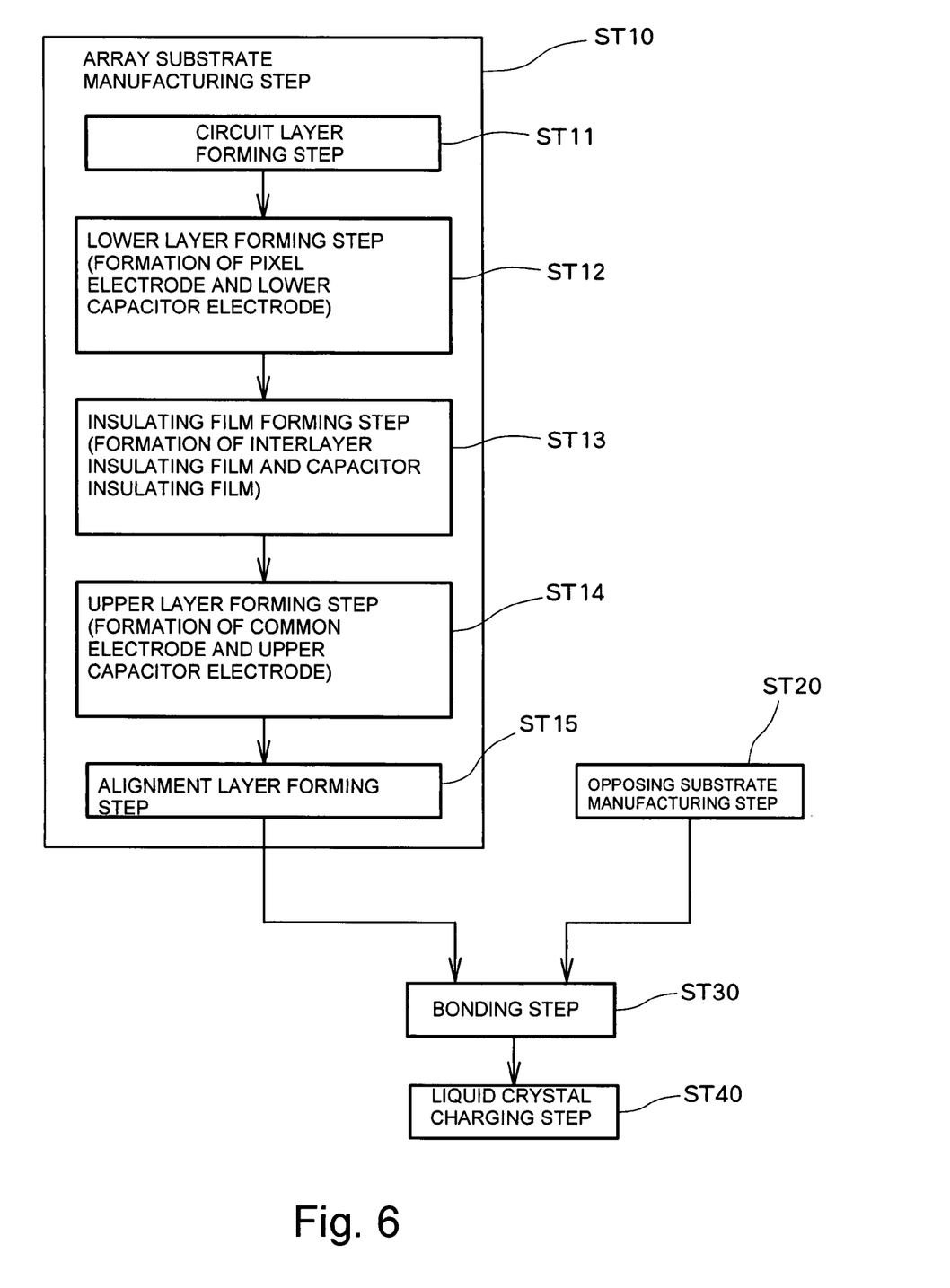
FIG. 6 is a flowchart showing processes in a manufacturing method of a liquid crystal panel according to a preferred embodiment of the invention.

FIG. 6 is a flowchart showing processes of a manufacturing method of the liquid crystal panel 10. As shown in FIG. 6, the manufacturing method of the liquid crystal panel 10 includes an array substrate manufacturing step ST10, an opposing substrate manufacturing step ST20, a bonding step ST30, and a liquid crystal charging step ST40. The array substrate manufacturing step ST10 includes a circuit layer forming step ST11, a lower layer forming step ST12, an insulting film forming step ST13, an upper layer forming step ST14, and an alignment layer forming step ST15.

The array substrate manufacturing step ST10 will now be described referring to cross sectional views of FIGS. 7-11 in addition to FIGS. 5 and 6.

Figure 7:
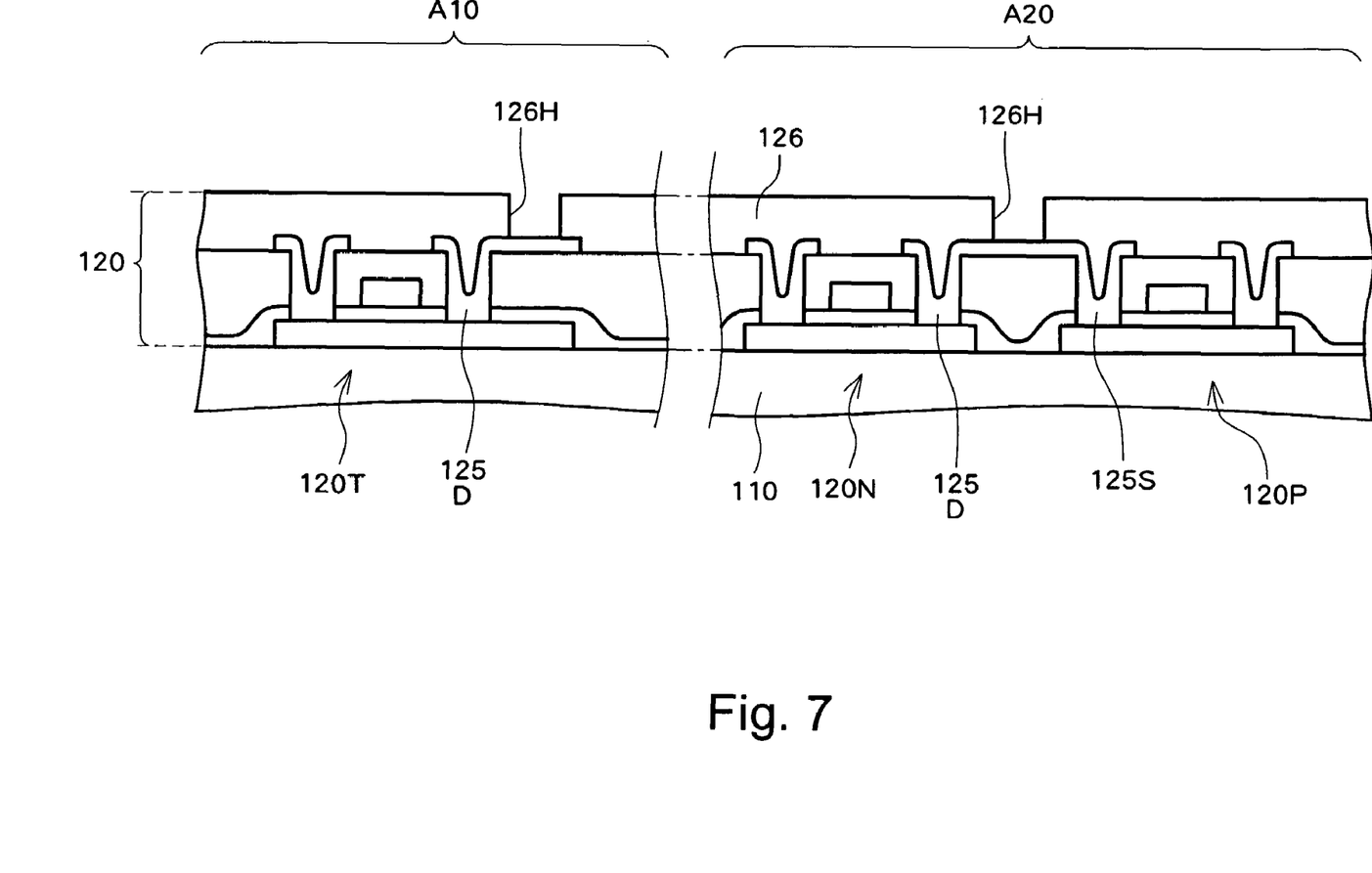
FIG. 7 is a cross sectional view for explaining a circuit layer forming process according to a preferred embodiment of the invention.

In the circuit layer forming step ST11, as shown in FIG. 7, the circuit layer 120 is formed on the substrate 110 using various film formation techniques, patterning techniques, etc.

A contact hole 126H reaching the drain electrode 125D of the pixel TFT 120T and a contact hole 126H reaching the drain electrode 125D of the N-channel TFT 120N or the source electrode 125S of the P-channel TFT 120P are formed through the interlayer insulating film 126.

Figure 8:
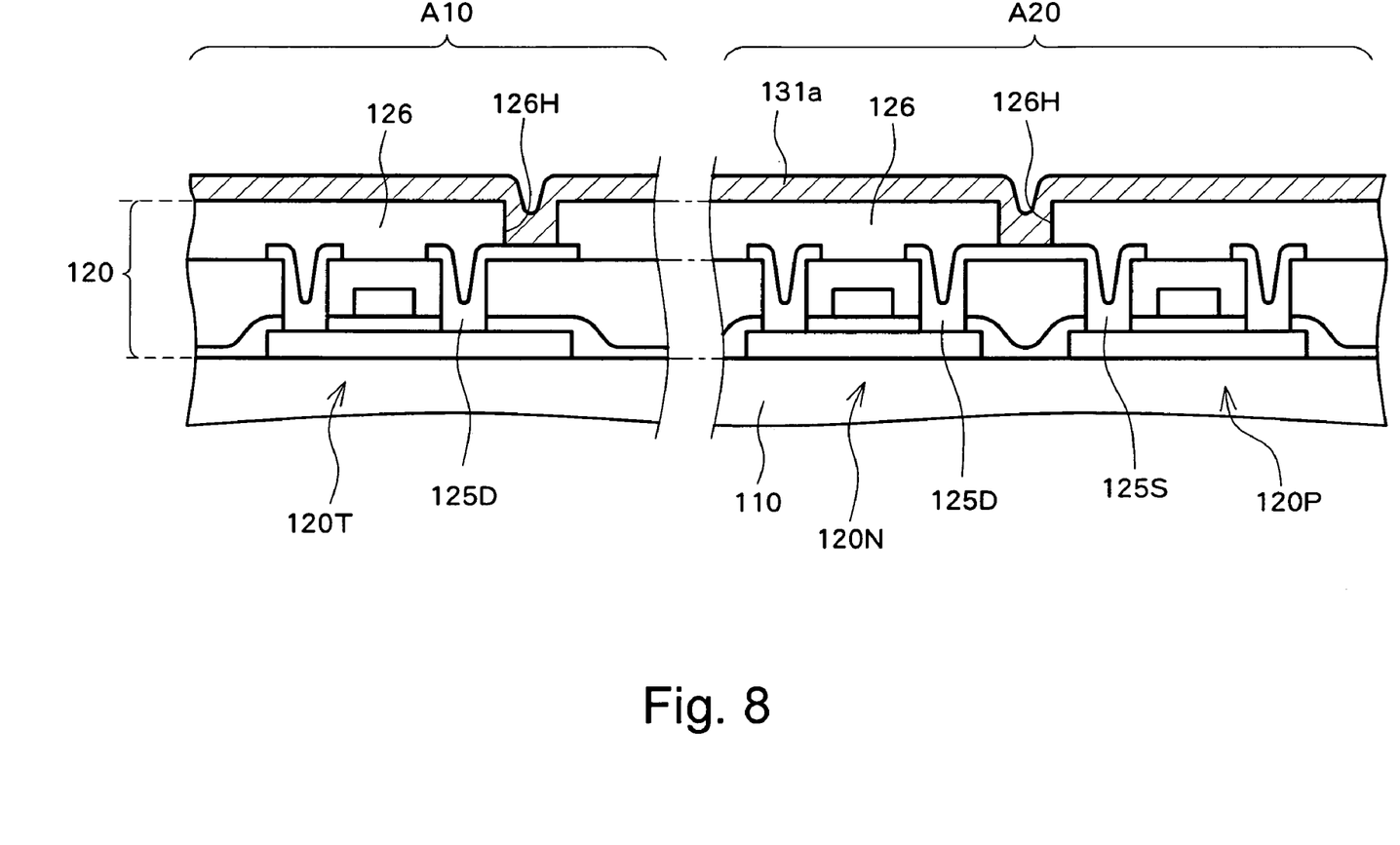
FIG. 8 is a cross sectional view for explaining a lower layer forming process according to a preferred embodiment of the invention.
Figure 9:
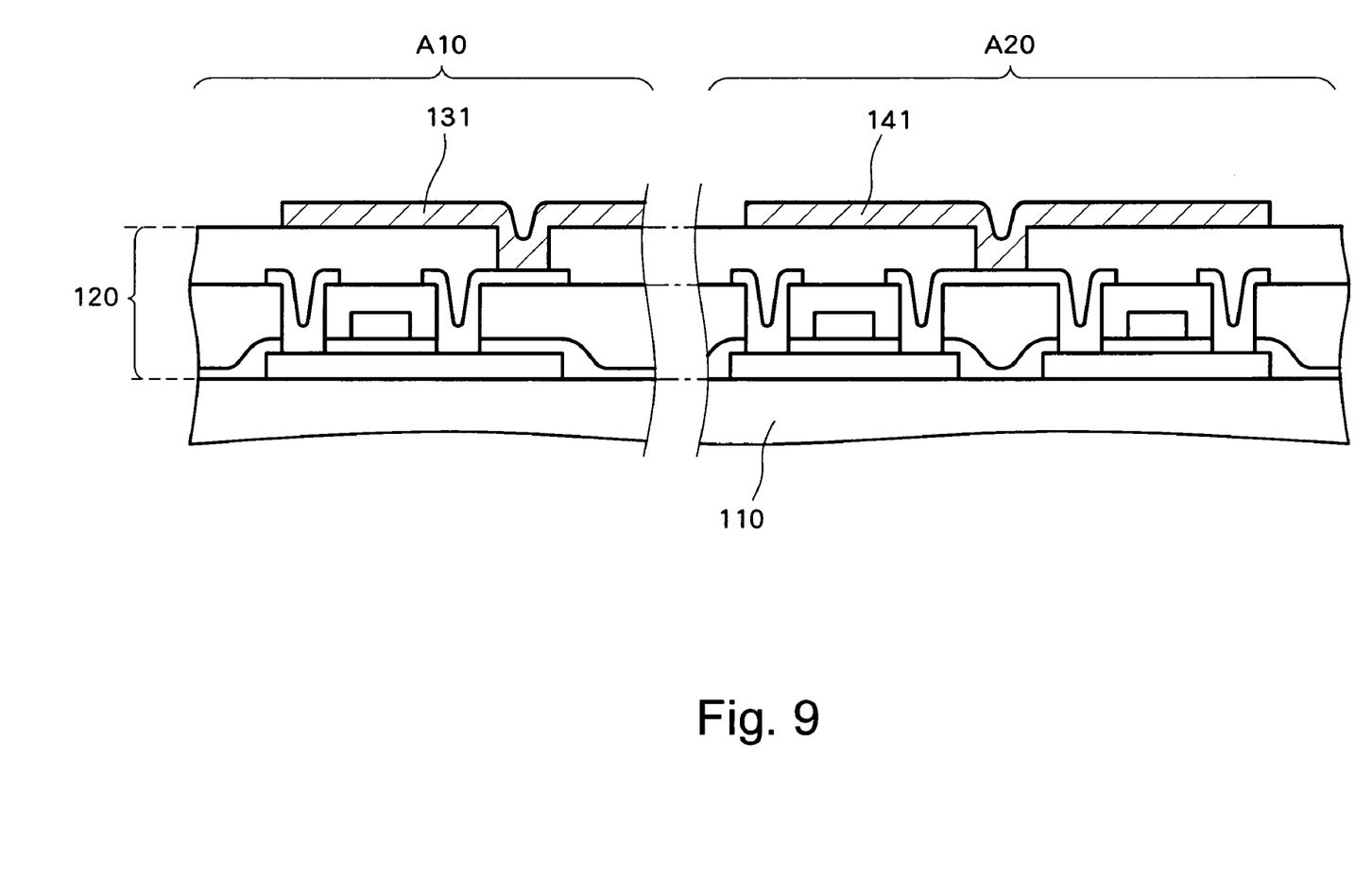
FIG. 9 is a cross sectional view for explaining a lower layer forming process according to a preferred embodiment of the invention.

In the lower layer forming step ST12, as shown in FIG. 8, a light-transmitting conductive film made of, for example, ITO or IZO is formed above the interlayer insulating film 126 of the circuit layer 120 as a lower conductive film 131a over the display region A10 and the peripheral region A20. The lower conductive film 131a is patterned as shown in FIG. 9. With this patterning process, the pixel electrode 131 is formed in the display region A10 using the lower conductive film 131a and the lower capacitor electrode 141 is formed in the peripheral region A20 using the lower conductive film 131a. Because the pixel electrode 131 and the lower capacitor electrode 141 are formed using a single conductive film 131a, the electrodes 131 and 141 are formed of the same material and in the same thickness.

Figure 10:
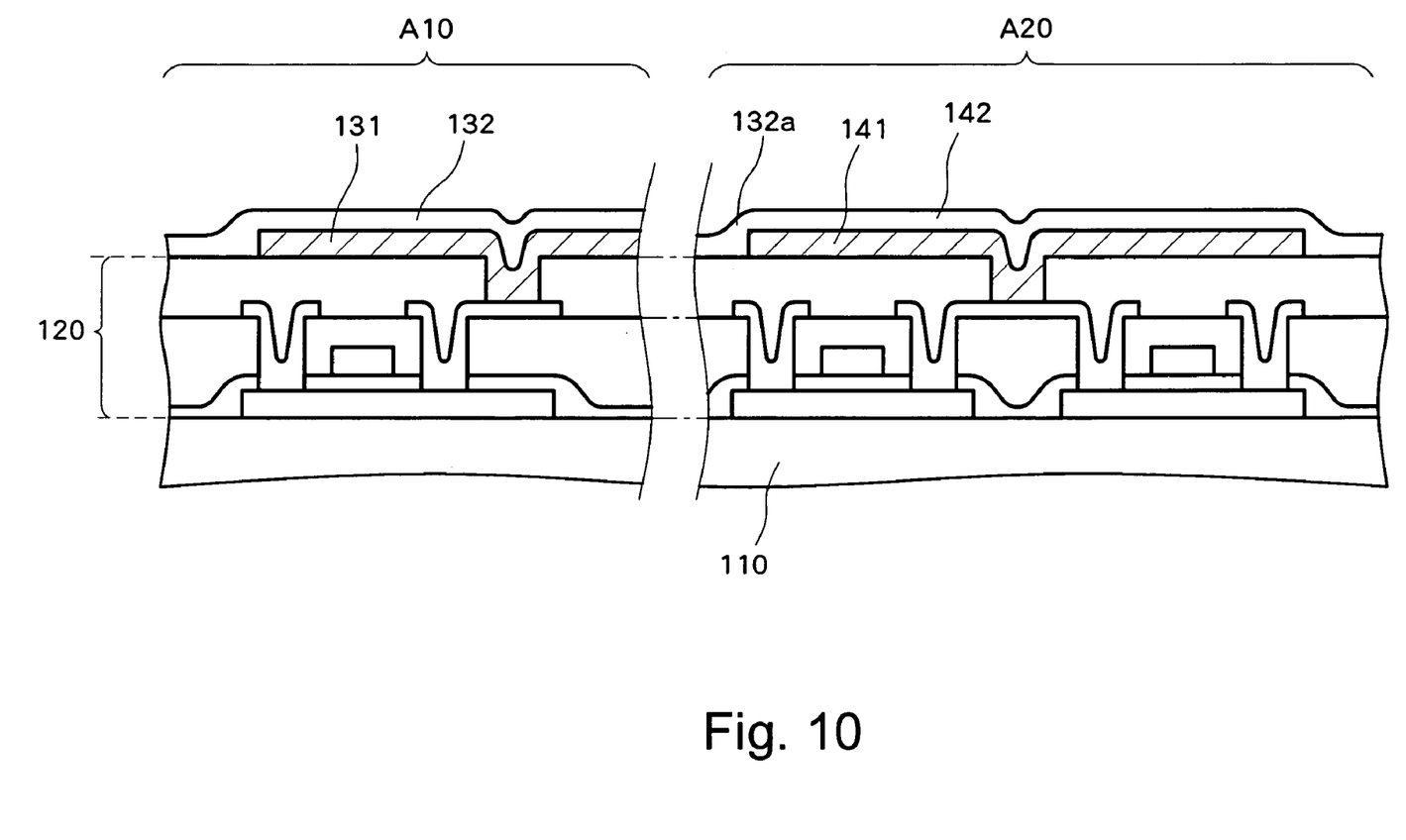
FIG. 10 is a cross sectional view for explaining an insulating film forming process according to a preferred embodiment of the invention.

In the insulating film forming step ST13, as shown in FIG. 10, an insulating film 132a such as, for example, a silicon oxide film is formed over the display region A10 and the peripheral region A20. Thus, the insulating film 132a is formed on the pixel electrode 131 and the lower capacitor electrode 141. In this manner, the interlayer insulating film 132 is formed in the display region A10 using the insulating film 132a on the pixel electrode 131, and the capacitor insulating film 142 is formed in the peripheral region A20 using the insulating film 132a on the lower capacitor electrode 141. The insulating film 132a is patterned as necessary. Because the interlayer insulating film 132 and the capacitor insulating film 142 are formed using a single insulating film 132a, the insulating films 132 and 142 are formed of the same material and in the same thickness.

Figure 11:
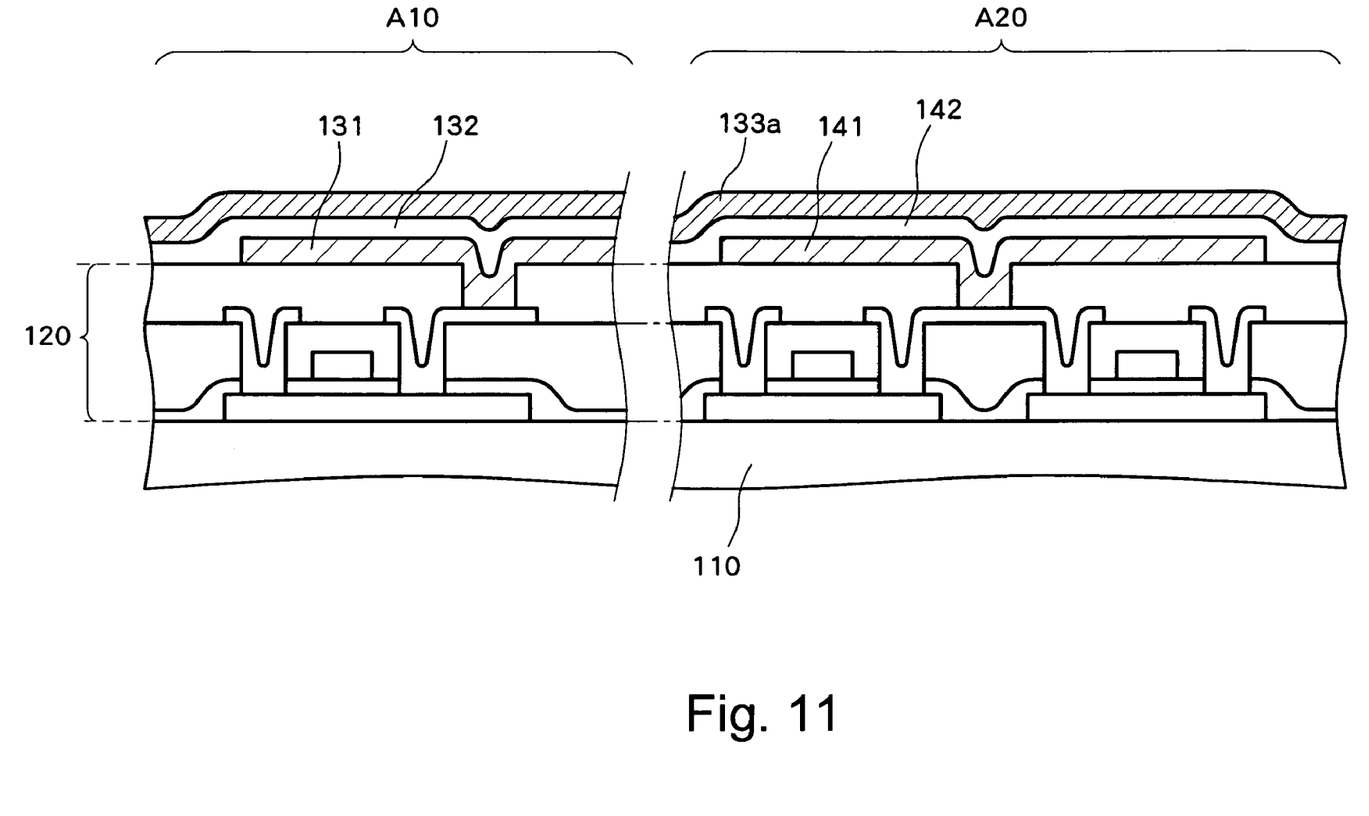
FIG. 11 is a cross sectional view for explaining an upper layer forming process according to a preferred embodiment of the invention.

In the upper layer forming step ST14, as shown in FIG. 11, a light-transmitting conductive film such as, for example, ITO or IZO is formed over the display region A10 and the peripheral region A20, as an upper conductive film 133a. Thus, the upper conductive film 133a is formed on the interlayer insulating film 132 and the capacitor insulating film 142, that is, above the pixel electrode 131 and above the lower capacitor electrode 141. Then, the upper conductive film 133a is patterned so that the common electrode 133 having an opening (refer to FIGS. 2A and 2B) is formed above the pixel electrode 131 as shown in FIG. 5 and the upper capacitor electrode 143 is formed above the lower capacitor electrode 141. Because the common electrode 133 and the upper capacitor electrode 143 are formed using a single conductive film 133a, the electrodes 133 and 143 are formed of the same material and in the same thickness.

In the formation and patterning of the conductive films 131a and 133a and the insulating film 132a, various film formation techniques and patterning techniques can be employed.

Then, in the alignment layer forming step ST15, the alignment layer (not shown) is applied at least on the common electrode 133 in the display region A10, and a rubbing process is performed.

In the opposing substrate manufacturing step ST20, on the other hand, the opposing substrate 200 (refer to FIG. 1) is manufactured employing various film formation techniques and patterning techniques.

In the bonding step ST30, a sealing material is placed on a periphery of at least one of the array substrate 100 and the opposing substrate 200, and the substrates 100 and 200 are placed with the alignment layers (not shown) opposing each other and are bonded together. In this manner, a container in which the liquid crystal 310 is charged, commonly referred to as an "empty panel" or "empty cell" is formed. In the liquid crystal charging step ST40, the liquid crystal 310 is charged into the empty panel which is formed in the bonding step ST30, and the charging entrance is closed.

As described, the capacitor 140 and the TFTs 120N and 120P to be connected to the capacitor 140 are layered. Because of this, enlargement of the peripheral region A20 can be inhibited even when the area of the capacitor 140 is increased, compared to a structure in which the capacitor formed using the layered structure, for example, of the gate line and the polysilicon line is placed in the circuit layer 120 alongside the circuit element. In other words, the capacitance of the capacitor 140 can be increased while enlargement of the peripheral region A20 is inhibited. Here, the layer structure of the capacitor 140 and the TFTs 120N and 120P can be achieved by the liquid crystal panel 10 having the pixel electrode 131, the interlayer insulating film 132 and the common electrode 133 layered above the circuit layer 120.

With the layering of the capacitor 140 and the TFTs 120N and 120P, the degree of integration of circuits in the peripheral region A20 is increased. In this case, with the increase in the capacitance of the capacitor and the increase in the degree of integration of circuits, the circuit scale in the peripheral region A20 can be increased. For example, it is possible to provide a digital-to-analog converter, a counter, an operational amplifier or the like, in addition to the shift register, voltage boosting circuit, buffer, etc. With the increase in the degree of integration of circuits in the peripheral region A20, it is possible to enlarge the display region A10, or to reduce the size of the liquid crystal panel 10 by reducing the size of the substrate 110.

Alternatively, it is also possible to separately form the interlayer insulating film 132 and the capacitor insulating film 142 in the insulating film forming step ST13, to form the capacitor insulating film 142 with a material different from that of the interlayer insulating film 132 and in a different thickness than that of the interlayer insulating film 132. With this configuration, various capacitances can be set for the capacitor 140.

Figure 12:
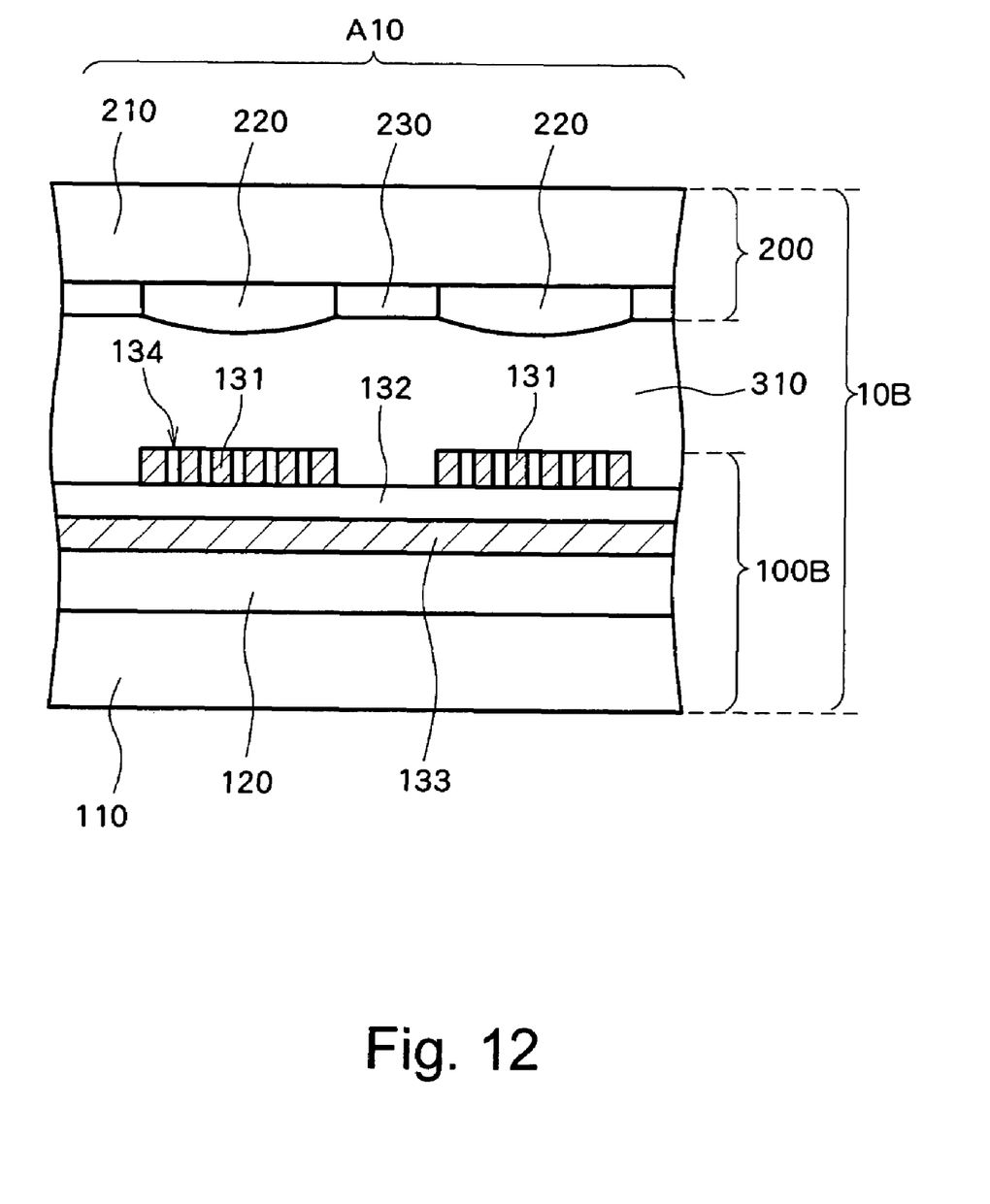
FIG. 12 is a cross sectional view showing another liquid crystal panel according to a preferred embodiment of the invention.

The capacitor 140 can also be used in a liquid crystal panel 10B as shown in cross sectional view in FIG. 12. FIG. 12 shows only the structure in the display region A10 of the liquid crystal panel 10B. The liquid crystal panel 10B has a structure in which the array substrate 100 of the liquid crystal panel 10 of FIG. 1 is replaced with an array substrate 100B.

In the array substrate 100B, the placement relationship between the pixel electrode 131 and the common electrode 133 is reversed compared to that in the array substrate 100 of FIG. 1. Thus, the common electrode 133, the interlayer insulating film 132, and the pixel electrode 131 are formed above the circuit layer 120 in this order. In other words, in the array substrate 100B, the common electrode 133 is provided as the lower display electrode and the pixel electrode 131 is provided as the upper display electrode. In addition, in the array substrate 100B, the openings 134 are formed through the pixel electrode 131, and the electric field E (refer to FIG. 4) between the pixel electrode 131 and the common electrode 133 is formed via each opening 134. The liquid crystal panel 10B also is an FFS mode liquid crystal panel. The remaining elements of the array substrate 100B are similar to those of the array substrate 100 of FIG. 1.

In the liquid crystal panel 10B also, because the common electrode 133, the interlayer insulating film 132, and the pixel electrode 131 are layered, the capacitor 140 can be layered above the circuit layer 120 by forming the common electrode 133 and the lower capacitor electrode 141 using the lower conductive film 131*a* (refer to FIG. 8) and forming the pixel electrode 131 and the upper capacitor electrode 143 using the upper conductive film 133*a* (refer to FIG. 11).

It will be obvious to those having skill in the art that many changes may be made in the above-described details of the preferred embodiments of the invention The scope of the invention, therefore, should be determined by the following claims.

What is claimed is:

1. An array substrate for a liquid crystal panel, the array substrate comprising:
    a lower display electrode and an upper display electrode which are layered with an interlayer insulating film therebetween in a display region and which are capable of forming an electric field for controlling an alignment of liquid crystal; and
    a circuit element and a capacitor which are layered in a peripheral region external to the display region and which are connected to each other; wherein the capacitor includes:
        a lower capacitor electrode formed of the same material as that of the lower display electrode and in the same thickness as that of the lower display electrode;
        an upper capacitor electrode formed of the same material as that of the upper display electrode and in the same thickness as that of the upper display electrode; and
        a capacitor insulating film provided between the lower capacitor electrode and the upper capacitor electrode;
    wherein the capacitor and the circuit element are provided in positions overlapping each other.

2. The array substrate for a liquid crystal panel according to claim 1, wherein the capacitor insulating film is formed of the same material as that of the interlayer insulating film and in the same thickness as that of the interlayer insulating film.

3. A liquid crystal panel comprising:
    an array substrate including a lower display electrode and an upper display electrode which are layered with an interlayer insulating film therebetween in a display region and a circuit element and a capacitor which are layered in a peripheral region external to the display region and which are connected to each other, wherein an alignment of liquid crystal is controlled by an electric field between the lower display electrode and the upper display electrode; and
    an opposing substrate placed opposing the array substrate with the liquid crystal therebetween, wherein the capacitor includes:
        a lower capacitor electrode formed of the same material as that of the lower display electrode and in the same thickness as that of the lower display electrode;
        an upper capacitor electrode formed of the same material as that of the upper display electrode and in the same thickness as that of the upper display electrode; and
        a capacitor insulating film provided between the lower capacitor electrode and the upper capacitor electrode;
    wherein the capacitor and the circuit element are provided in positions overlapping each other.

* * * * *